United States Patent
Yu et al.

(10) Patent No.: US 11,036,893 B2
(45) Date of Patent: *Jun. 15, 2021

(54) DATA RETENTION METHOD

(71) Applicant: WALTON ADVANCED ENGINEERING INC., Kaohsiung (TW)

(72) Inventors: Hong Chi Yu, Kaohsiung (TW); Mao Ting Chang, Kaohsiung (TW)

(73) Assignee: WALTON ADVANCED ENGINEERING INC., Kaohsiung (TW)

( * ) Notice: Subject to any disclaimer, the term of this patent is extended or adjusted under 35 U.S.C. 154(b) by 163 days.

This patent is subject to a terminal disclaimer.

(21) Appl. No.: 16/276,698

(22) Filed: Feb. 15, 2019

(65) Prior Publication Data

US 2020/0193070 A1    Jun. 18, 2020

(30) Foreign Application Priority Data

Dec. 18, 2018  (TW) .................................. 107145631

(51) Int. Cl.
| | |
|---|---|
| *H04L 29/00* | (2006.01) |
| *G06F 21/88* | (2013.01) |
| *G06F 12/14* | (2006.01) |
| *G06F 21/60* | (2013.01) |
| *G06F 21/86* | (2013.01) |

(52) U.S. Cl.
CPC .......... *G06F 21/88* (2013.01); *G06F 12/1408* (2013.01); *G06F 21/602* (2013.01); *G06F 21/86* (2013.01)

(58) Field of Classification Search
CPC ........ G06F 21/32; G06F 21/602; G06F 21/78; G06F 21/86; G06F 21/88; G06F 12/1408; G06F 1/26; G06F 21/34; G06F 3/03548; G06F 3/044

See application file for complete search history.

(56) References Cited

U.S. PATENT DOCUMENTS 6,331,812 B1 * 12/2001 Dawalibi ........... G07C 9/00817
                                                                 340/5.2

* cited by examiner

*Primary Examiner* — Ghazal B Shehni
(74) *Attorney, Agent, or Firm* — Bacon & Thomas, PLLC

(57) ABSTRACT

The present disclosure relates to a data retention method which ensures security of classified information in design. The data retention method comprises steps as follows: a data plug of a dedicated storage module is inserted into a data socket of an encryption module and a locking element of a lock fastener module is fixed at a locking hole on the dedicated storage module; the encryption module and the dedicated storage module are electrically connected to each other through the data socket; an external component of the encryption module is electrically connected to an external device such that classified information (saved or to be saved) is encrypted or decrypted between the external device and a storage element of the dedicated storage module by an encryption component of the encryption module during data exchanges.

8 Claims, 11 Drawing Sheets

DATA RETENTION METHOD

BACKGROUND OF THE INVENTION

1) Field of the Invention

The present disclosure relates to a data retention method for encryption of data, particularly a dedicated storage module saving classified information and physically removed from a data retention device, such that classified information encrypted by an encryption module is accessed from the dedicated storage module with an external component electrically connected to an external device.

2) Description of the Prior Art

When the personal cloud is widely used in a private network, centralized management is available to private storage devices gradually and centralized data management and backup is provided by independent network storage devices which are connected to the private network; however, the privacy issue of personal data is exposed correspondingly.

The patent documentations with respect to storage systems are shown as follows:

U.S. Ser. No. 13/971,732 discloses a device for secure storage of data in a computer system and a method thereof. As shown in U.S. Ser. No. 13/971,732, data in a SATA drive is transparently encrypted or decrypted in the software layer as shown in the embodiment. It can be seen from U.S. Ser. No. 13/971,732 that any software-level modification of files, drivers, operating system or applications is unnecessary. Comparatively, an encrypted key is managed in a remote central management system or a local computer system. As shown in the embodiment, the background drive backup is based on snapshots. Additional security features in the embodiment are priority and/or background virus scanning for a secure subsystem in which high-capacity data in SATA drives is saved, virtual/network driving machine, RAM driving machine and port selector.

As shown in R.O.C. Patent TW 1584151, a flash drive with a safety mechanism is applicable to a computer device for accessing digital data and comprises a data storage device and a remote unlocking device. The data storage device comprises a data storage module, a data unlocking control module and a data wireless transmission module. The remote unlocking device comprises an unlocking wireless transmission module and a key generation module. When the data storage device and a computer device are connected to each other, a data access module is controlled by the data unlocking control module for no data access to the data storage device by the computer device. The remote unlocking device sends information of an encrypted key to the data storage device wirelessly for the data storage module under control and data access from the data storage device available to the computer device.

European Patent EP 12178889.7 discloses a method to safely access a service inside a defined trustable environment. As shown in EP 12178889.7, there is at least a network component existing in the defined trustable environment and having a password saved internally. When a user device is introduced into the trustable environment, the user device will contact the network component to receive the password saved in the network component. Then, the password is transmitted to the service by the user device and checked with a matched password saved in the service for activation of the service.

However, the data privacy issue still exists. For better data privacy without the above problem, a data retention method is provided in the present disclosure.

SUMMARY OF THE INVENTION

In virtue of the above problem, a data retention method is used in encryption of data and provided with a separate dedicated storage module for better security.

A data retention method in the present disclosure relies on multiple safety precautions for promotion of data security.

A data retention method in the present disclosure features components energized through a fingerprint for least classified information accessed by unrelated persons probably.

A data retention method in the present disclosure depends on a specific data plug in coordination with a data outlet for no unrelated electric connection.

A data retention method in the present disclosure depends on a locking element for supply of electric power to specific modules which are not energized by another power source directly.

A data retention method in the present disclosure features an external component and an external device, both of which are electrically connected to each other, for implementation of data exchanges through the data retention method easily.

A data retention method in the present disclosure depends on an encryption component in coordination with a fingerprint switch to encrypt classified information and transmit classified information to a dedicated storage module.

A data retention method in the present disclosure effectuates no classified information accessed from a dedicated storage module without a corresponding fingerprint.

To this end, the present application adopts the following technical measures. A data retention method comprises steps as follows: step 1: a data plug of a dedicated storage module is inserted into a data socket of an encryption module and a locking element of a lock fastener module is fixed at a locking hole on the dedicated storage module; step 2: the encryption module and the dedicated storage module is electrically connected to each other through the data socket; step 3: an external component of the encryption module is electrically connected to an external device such that classified information is encrypted or decrypted between the external device and a storage element of the dedicated storage module by an encryption component of the encryption module during data exchanges.

A data detention method in the present disclosure is further embodied according to the following technical measure.

In the above data detention method, a power source component is activated by a fingerprint switch before step 1.

In the above data detention method, a power receiving port in the locking hole and a power supply port in the locking element are electrically connected to each other after step 1.

In the above data detention method, the external component of the encryption module is electrically connected to the external device such that classified information is encrypted or decrypted in the external device once by the encryption component of the encryption module during data exchanges and saved in an ordinary storage device.

In the above data detention method, an indicator for the encryption module can display corresponding operation status.

In the above data detention method, a key which has been encrypted by the encryption component can be redefined through the fingerprint switch in step 3.

In the above data detention method, the locking element of the lock fastener module is released from the locking hole on the dedicated storage module and the data plug of the dedicated storage module is separated from the data socket of the encryption module after step 3.

In the above data detention method, a key which has been redefined by the fingerprint switch is available in step 3 when the classified information is accessed after step 1 again.

In contrast to the prior art, a data retention method in the present disclosure has following effects: (1) a specific data plug in coordination with a data socket for no unrelated electric connection; (2) components energized through a fingerprint for least classified information accessed by unrelated persons probably; (3) encrypted data and a separate dedicated storage module for better data security.

BRIEF DESCRIPTIONS OF THE DRAWINGS

DETAILED DESCRIPTIONS OF THE PREFERRED EMBODIMENTS

A data retention method is further illustrated in the preferred embodiment for clear understanding of purposes, characteristics and effects of the present disclosure.

Figure 1:
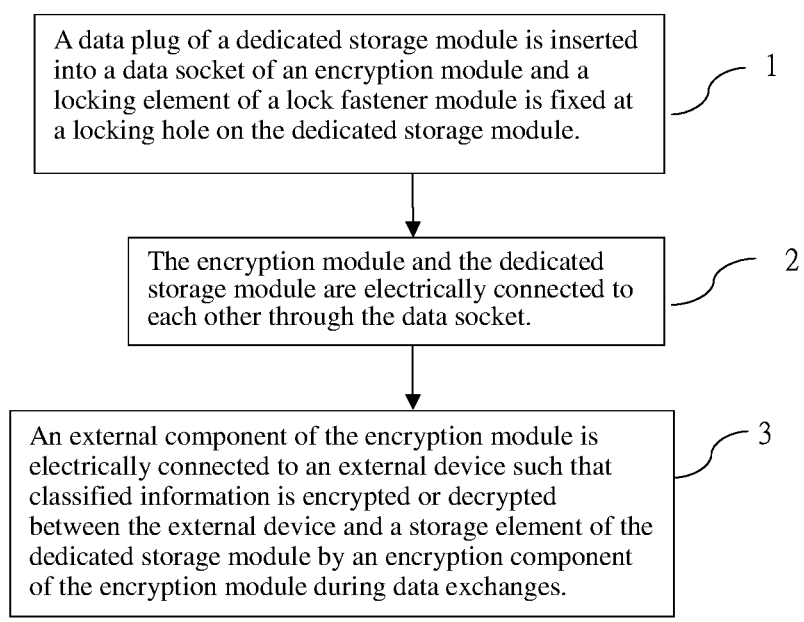
FIG. 1 is the first flowchart for a data retention method in a preferred embodiment.

Referring to FIG. 1, which illustrates a data retention method comprising a step 1 (1), a step 2 (2) and a step 3 (3).

As shown in FIG. 1, the step 1 (1) is to insert a data plug (11) of a dedicated storage module (10) into a data socket (21) of an encryption module (20) and fix a locking element (31) of a lock fastener module (30) at a locking hole (12) on the dedicated storage module (10).

As shown in FIG. 1, the step 2 (2) is to electrically connect the encryption module (20) and the dedicated storage module (10) through the data socket (21).

As shown in FIG. 1, the step 3 (3) is to electrically connect an external component (22) of the encryption module (20) and an external device (40) such that classified information (41) is encrypted or decrypted between the external device (40) and a storage element (14) of the dedicated storage module (10) by an encryption component (23) of the encryption module (20) during data exchanges.

In each step of a data retention method, an indicator (26) for the encryption module (20) can display corresponding operation status.

Figure 5A:
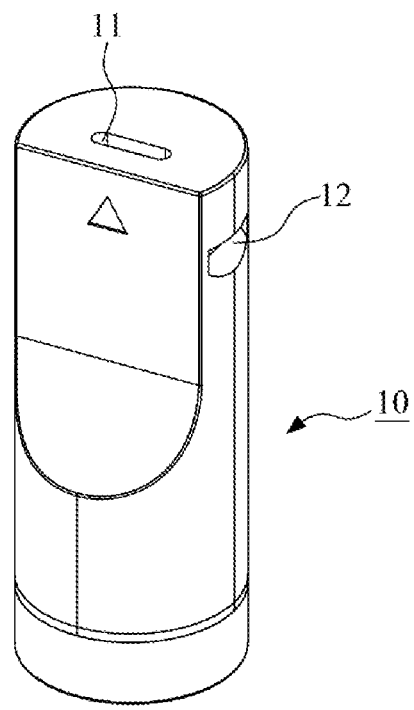
FIG. 5a is a side view of a dedicated storage module used in a data retention method in a preferred embodiment.
Figure 7A:
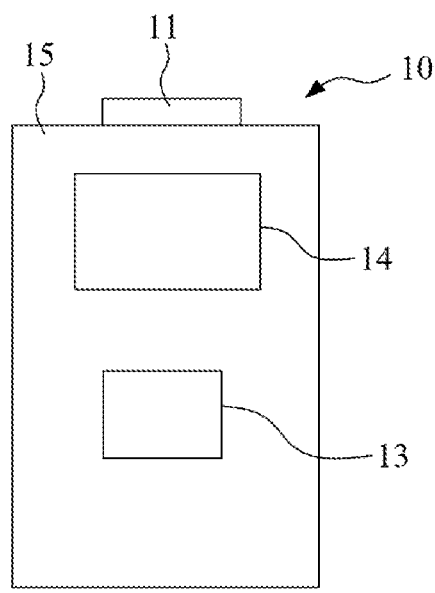
FIG. 7a is a schematic view of a dedicated storage module used in a data retention method in a preferred embodiment.

Referring to FIGS. 5a and 7a from which detailed conditions of the dedicated storage module (10) are clearly explained: the dedicated storage module (10) comprises a data plug (11), a locking hole (12), a control element (13), a storage element (14) and a substrate (15) which is electrically connected to all components in the dedicated storage module (10).

Specifically, the data plug (11) which presents as a plug with an electric-contact end for specially defined physical specifications (FIG. 5a) rather than universal specifications and no electric contacts beyond designs; the locking hole (12) designed at one side of the dedicated storage module (10) (FIG. 5a) and used to fix the dedicated storage module (10) at a designated position is conductive to stability between the data plug (11) and the data socket (21); the control element (13) is a logic machine with which a complicated computer program is executed; the storage element (14) means non-volatile memories (NVRAM) in which configurations and/or data are saved but not erased after disconnection of power; the substrate (15) is a circuit board usually, for example, a single-layered or multi-layered printed circuit board, a lead frame, a polyimide, a BT circuit board or a flip chip substrate, and comprises circuits interiorly (not shown in figures) as an interface for electric transmission.

Figure 6A:
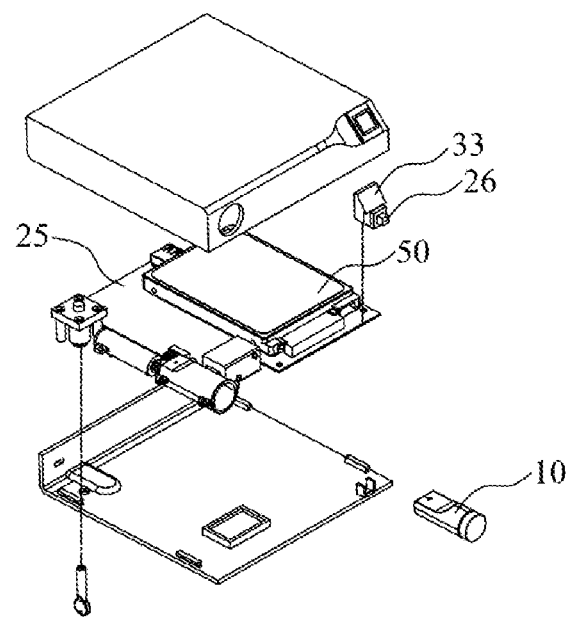
FIG. 6a is an exploded view of a data retention device in a preferred embodiment.
Figure 7B:
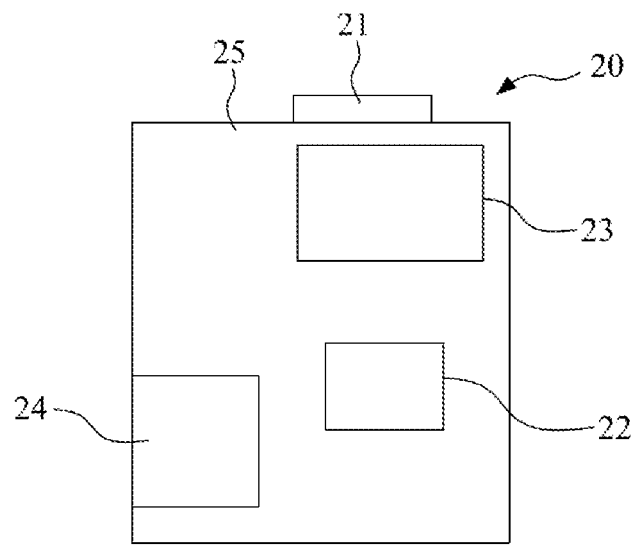
FIG. 7b is a schematic view of an encryption module used in a data retention method in a preferred embodiment.

Referring to FIGS. 6a and 7b from which detailed conditions of the encryption module (20) are clearly explained: the encryption module (20) comprises a data socket (21), an external component (22), an encryption component (23), a power source component (24) and a printed circuit board (25) which is electrically connected to all component in the encryption module (20).

Specifically, the data socket (21) which presents as a socket with an electric-contact end for specially defined physical specifications (FIG. 6c) rather than universal specifications and no electric contacts beyond designs; the external component (22) is an assembly providing a function to connect the internet, for example, network interface controller (NIC) that is wired or wireless hardware as an interface of data exchanges locally or remotely for network-based communications among different devices; the encryption component (23) in which symmetric or asymmetric algorithms are integrated internally for the high security level is also known as a security chip that prevents secret keys or data saved internally from being accessed or tampered illegally and provides the encryption module (20) with ciphered texts encrypted from plain texts and difficulty read wherein the ciphered texts should be deciphered and returned to normal readable plain texts by an authorized administrator owing a decryption key during a deciphering process; the power source component (24) which is connected to an external power source for running provides electric power to the dedicated storage module (10), the encryption module (20) and the lock fastener module (30); the printed circuit board (25) is a circuit board usually, for example, a single-layered or multi-layered printed circuit board, a lead frame, a polyimide, a BT circuit board or a flip chip substrate, and comprises circuits interiorly (not shown in figures) as an interface for electric transmission.

Referring to FIGS. 6a and 7b from which detailed conditions of the lock fastener module (30) are clearly explained: the lock fastener module (30) comprises a locking element (31) and a power element (32) wherein the locking element (31) is driven and shifted to another position by the power element (32) energized from the power source component (24).

In detail, the locking element (31) designed at one side of the dedicated storage module (10) (FIG. 2b) and used to fix the dedicated storage module (10) at a designated position is conductive to stability between the data plug (11) and the data socket (21); the power element (32) functioning as an electric motor is an electric device transforming electric energy to mechanical energy and further kinetic energy driving an external component or the dedicated storage module (10).

Figure 2:
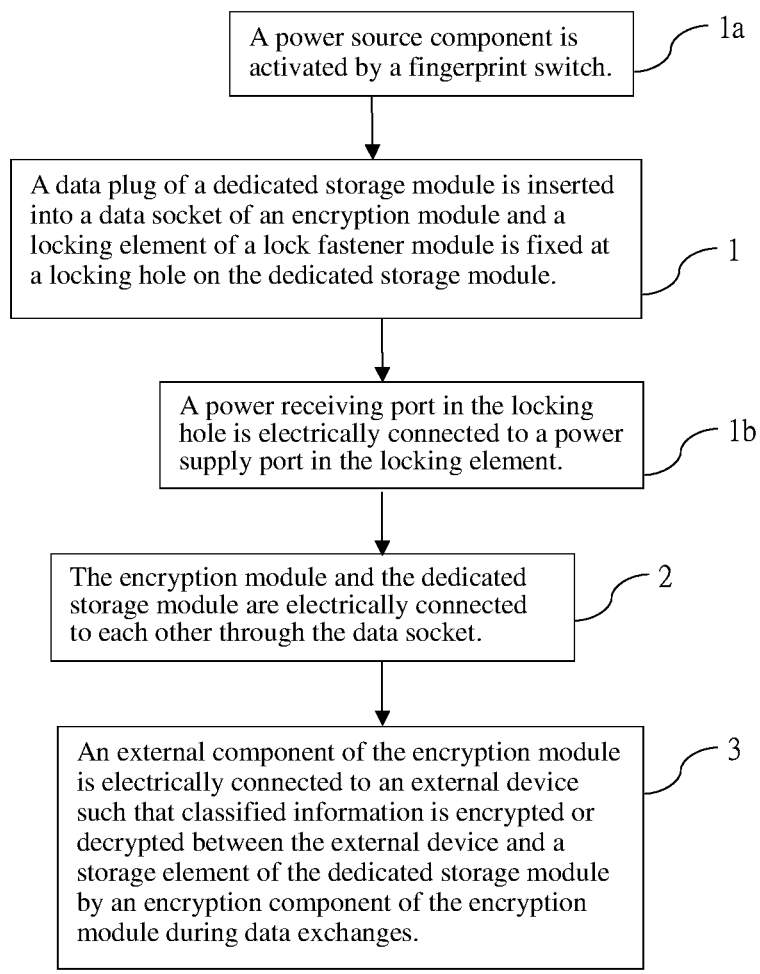
FIG. 2 is the second flowchart for a data retention method in a preferred embodiment.

Preferably, a data retention method further comprises a step 1a (1a) and a step 1b (1b), as shown in FIG. 2.

A data retention method comprises a step 1a (1a) before the step 1 (1) wherein the step 1a (1a) is to activate a power source component (24) by a fingerprint switch (33) installed inside the lock fastener module (30); the fingerprint switch (33) with the dual function of fingerprint recognition and power switch extracts an fingerprint image, ensuring connection of power with the power source component (24) activated by a fingerprint.

A data retention method comprises a step 1b (1b) after the step 1 (1) wherein the step 1b (1b) is to electrically connect a power receiving port in the locking hole (12) and a power supply port in the locking element (31); the power receiving port (not shown in figures) in the locking hole (12) and the power supply port (not shown in figures) in the locking element (31) are electrically connected to each other for supply of electric power to the dedicated storage module (10) which is uneasily energized by itself.

Figure 3:
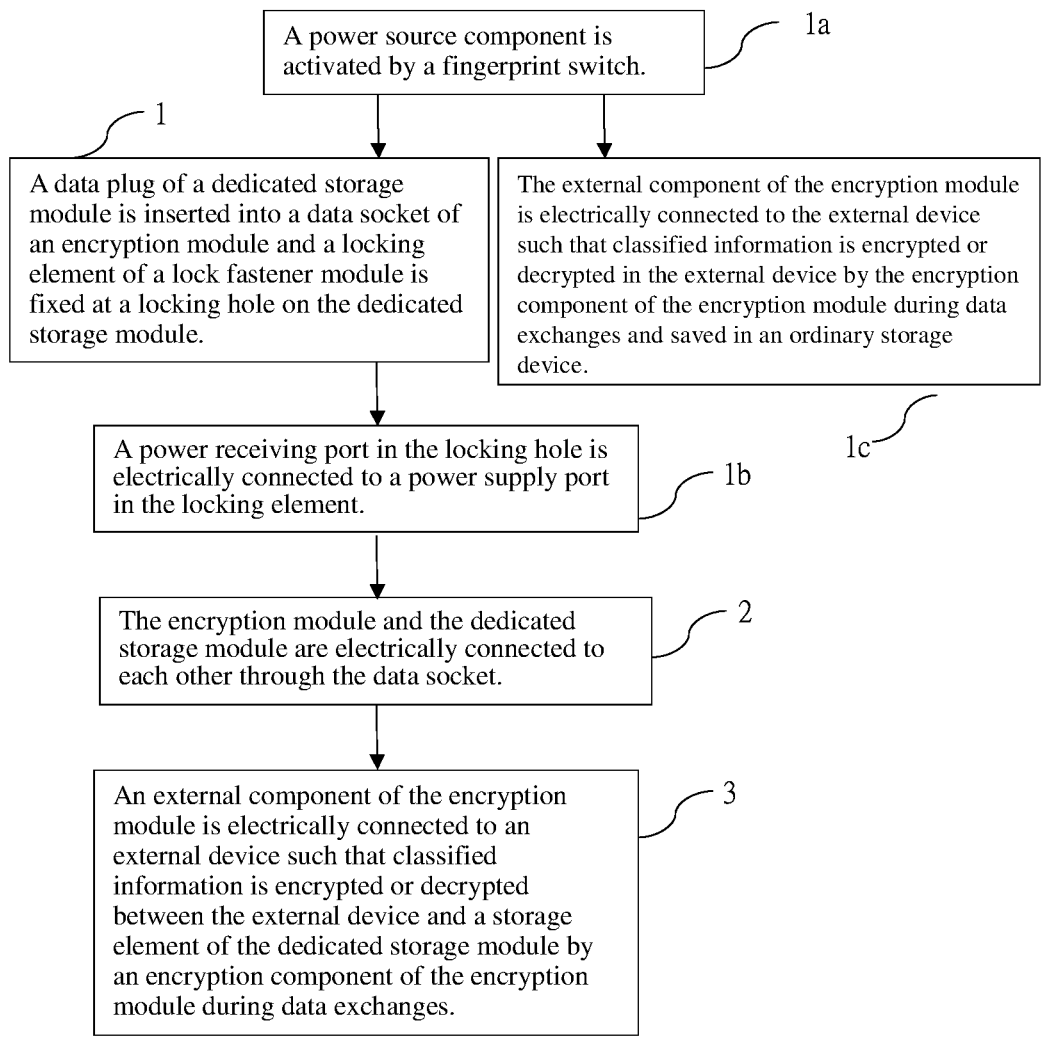
FIG. 3 is the third flowchart for a data retention method in a preferred embodiment.

Preferably, a data retention method further comprises a step 1c (1c) as shown in FIG. 3.

The step 1c (1c) after the step 1a (1a) is to electrically connect the external component (22) of the encryption module (20) and the external device (40) such that classified information (41) is encrypted or decrypted in the external device (40) once by the encryption component (23) of the encryption module (20) during data exchanges and saved in an ordinary storage device (50); the ordinary storage device (50) is electrically connected to the encryption module (20) for secondary security of files.

Figure 4A:
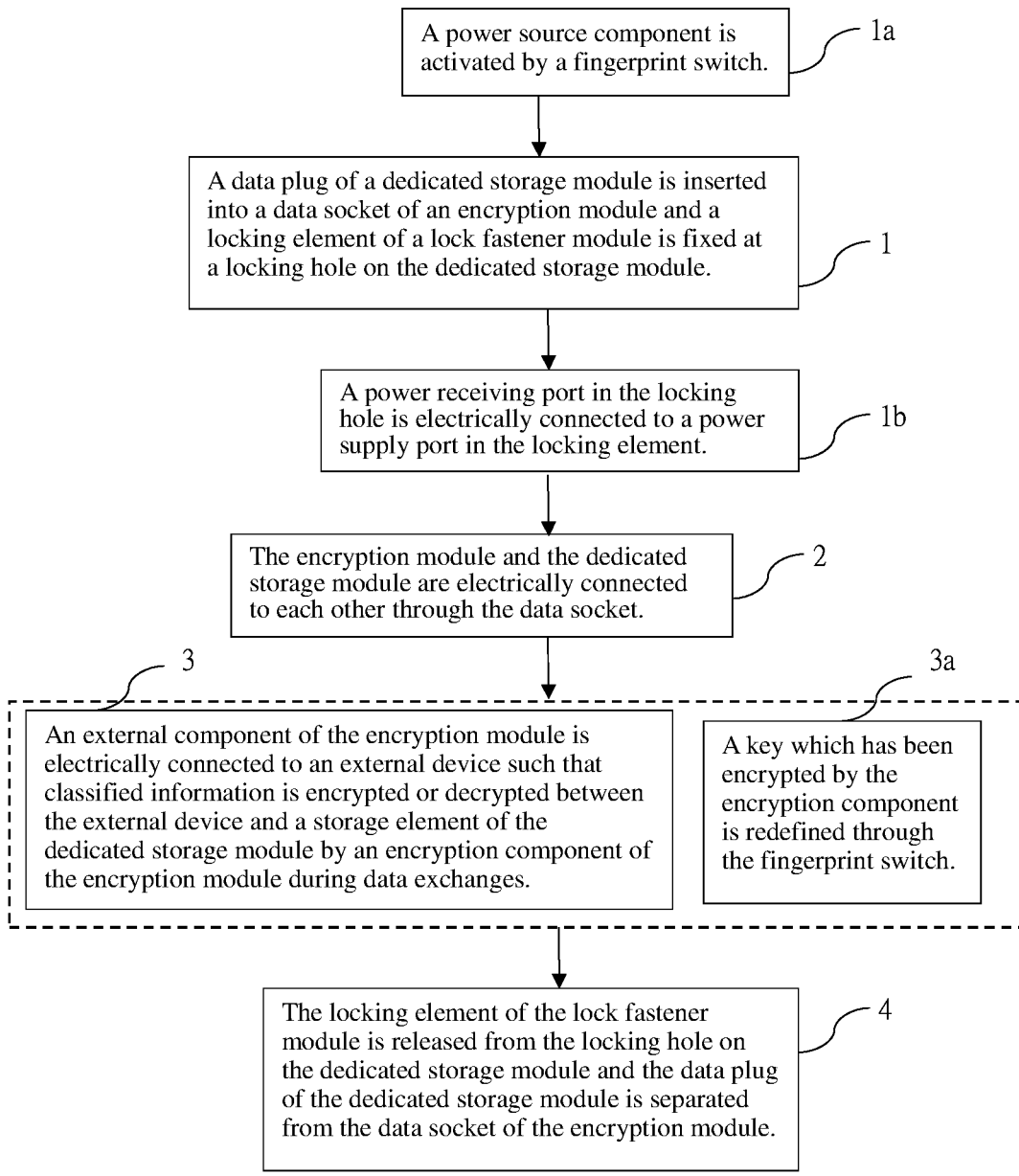
FIG. 4a is the fourth flowchart for a data retention method in a preferred embodiment.
Figure 4B:
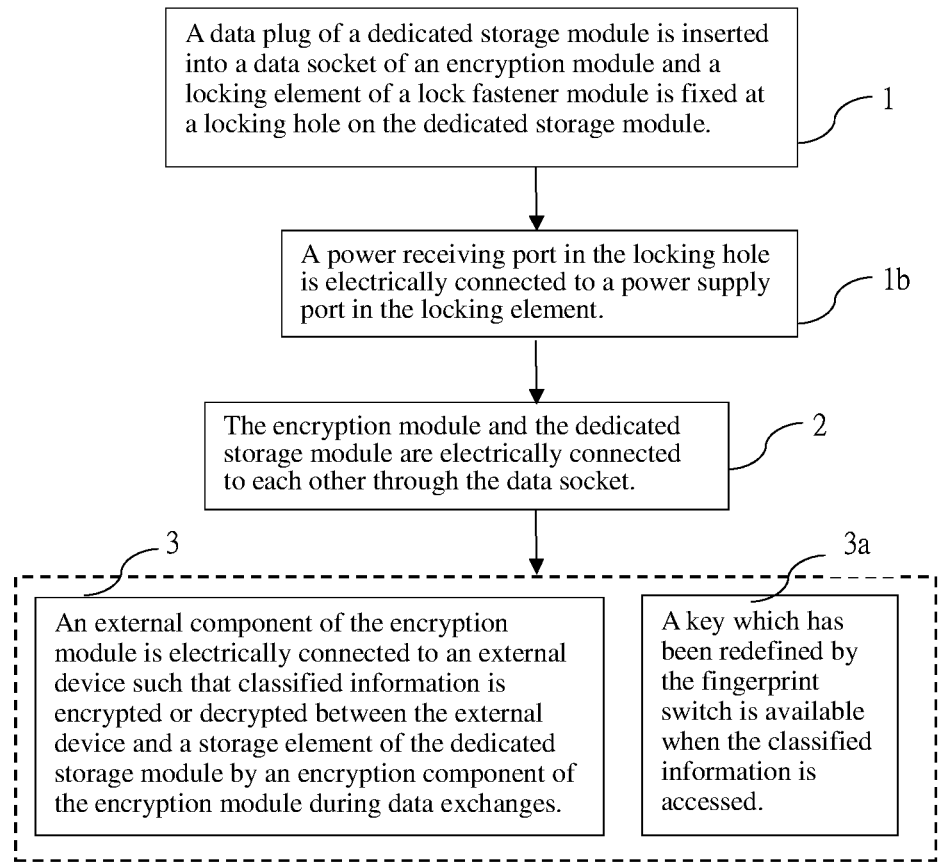
FIG. 4b is the fifth flowchart for a data retention method in a preferred embodiment.

Preferably, a data retention method further comprises a step 3a (3a), a step 3b (3b) and a step 4 (4) as shown in FIGS. 4a and 4b.

A data retention method further comprises a step 3a (3a) accompanied with the step 3 (3) such that a key which has been encrypted by the encryption component (23) is redefined through the fingerprint switch (33) for no classified information accessed from the dedicated storage module (10) without a corresponding fingerprint. Moreover, a step 4 (4) added after the step 3 (3) is to release the locking element (31) of the lock fastener module (30) from the locking hole (12) on the dedicated storage module (10) and to remove the data plug (11) of the dedicated storage module (10) from the data socket (21) of the encryption module (20); a step 3b (3b) accompanied with step 3 (3) is to use a key redefined by the fingerprint switch (33) before the classified information (41) is accessed after the step 1 (1).

Figure 6B:
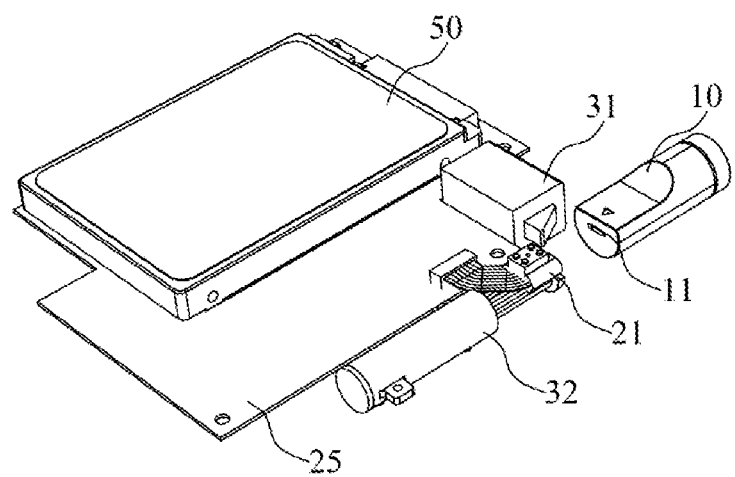
FIG. 6b is the first schematic view of using a dedicated storage module in a data retention method in a preferred embodiment.
Figure 6C:
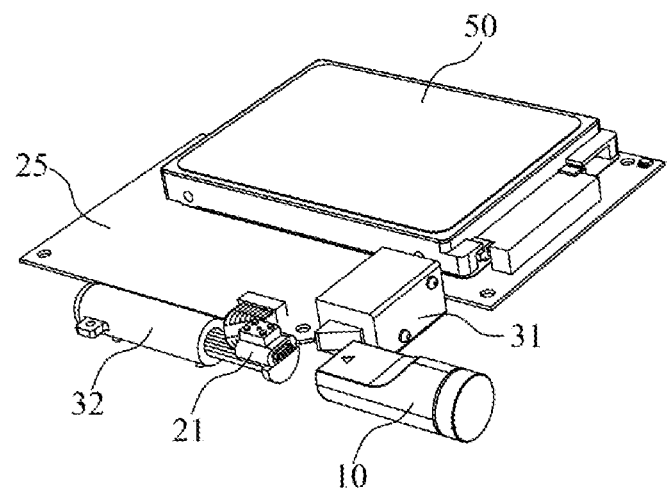
FIG. 6c is the second schematic view of using a dedicated storage module in a data retention method in a preferred embodiment.

Referring to FIGS. 6b and 6c, which illustrate changes in use between the dedicated storage module (10) and the encryption module (20): the dedicated storage module (10) is plugged into the encryption module (20) such that both the data plug (11) and the data socket (21) are shifted synchronously; the data plug (11) and the data socket (21) contact each other (not shown in figures), enabling the locking element (31) to be fixed in the locking hole (12) for stability between the data plug (11) and the data socket (21); a user triggers the locking element (31) to be released from the locking hole (12), detaching the dedicated storage module (10) by the power element (32) for separation between the data plug (11) and data socket (21) and removal of the dedicated storage module (10).

A detailed process for a data retention method in the present disclosure is explained in the preferred embodiment as follows.

Figure 5B:
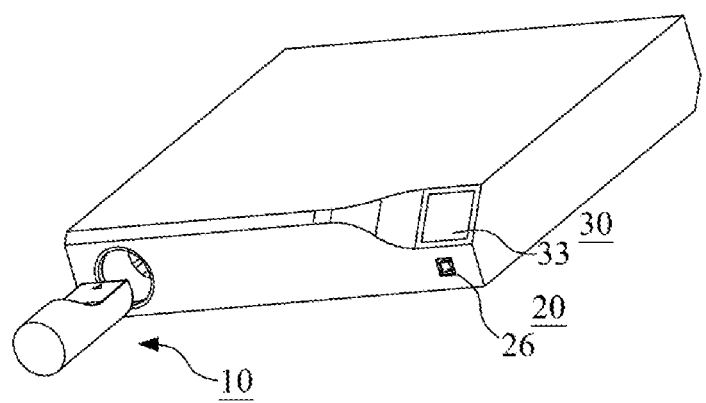
FIG. 5b is a side view for entire appearance of a data retention device used in a data retention method in a preferred embodiment.

Referring to FIGS. 5b and 6a. With power connected to the power source component (24) from an external power supply, the power source component (24) is activated through the fingerprint switch (33) such that the dedicated storage module (10), the encryption module (20) and the lock fastener module (30) are energized, as shown in the indicator (26) for running status.

Figure 7C:
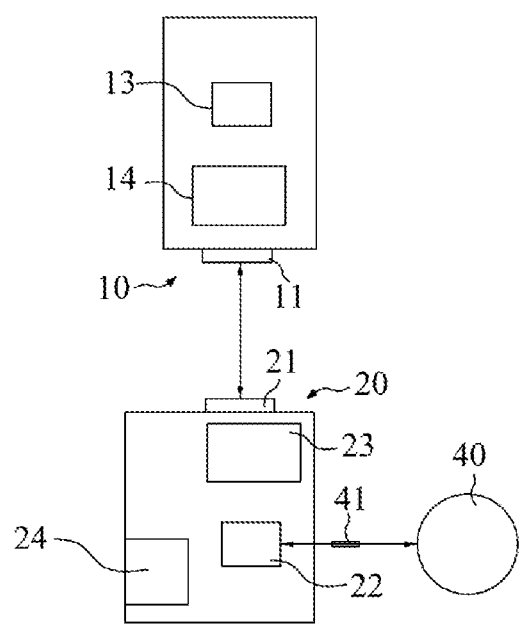
FIG. 7c is a schematic view which illustrates classified information is exchanged between an external device and an external component in a data retention method in a preferred embodiment.
Figure 7D:
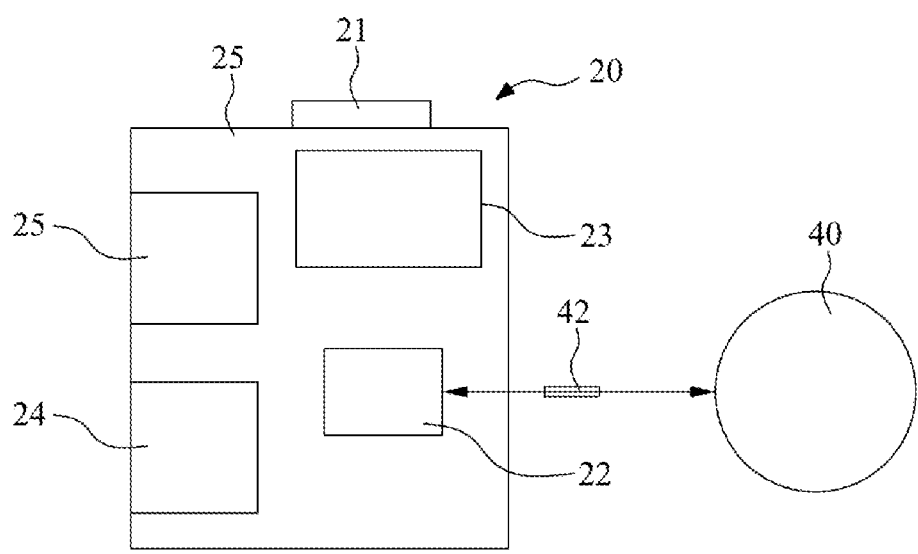
FIG. 7d is a schematic view which illustrates minor classified information is exchanged between an external device and an external component in a data retention method in a preferred embodiment.

As shown in FIG. 7d, the external component (22) of the encryption module (20) is electrically connected to the external device (40) such that classified information (41) is encrypted or decrypted in the external device (40) once by the encryption component (23) of the encryption module (20) during data exchanges and saved in the ordinary storage device (50).

When the data plug (11) is inserted into the data socket (21), both the data plug (11) and the data socket (21) are shifted synchronously, as shown in FIGS. 5b, 6b and 6c.

Moreover, the data plug (11) and the data socket (21) contacting each other (not shown in figures) activate the locking element (31) to be fixed inside the locking hole (12) for stability between the data plug (11) and the data socket (21); a power receiving port (not shown in figures) in the locking hole (12) and a power supply port (not shown in figures) in the locking element (31) are electrically connected to each other for supply of electric power to the dedicated storage module (10), as shown in the indicator (26) for running status.

Furthermore, as shown in FIG. 7c, the encryption module (20) is electrically connected to the dedicated storage module (10) through the data socket (21) and the external component (22) of the encryption module (20) is also electrically connected to the external device (40) for accessing classified information (41) that will be enciphered based on a key, which has been encrypted by the encryption component (23) and redefined through the fingerprint switch (33), and saved in the storage element (14), as shown in the indicator (26) for running status.

Figure 6D:
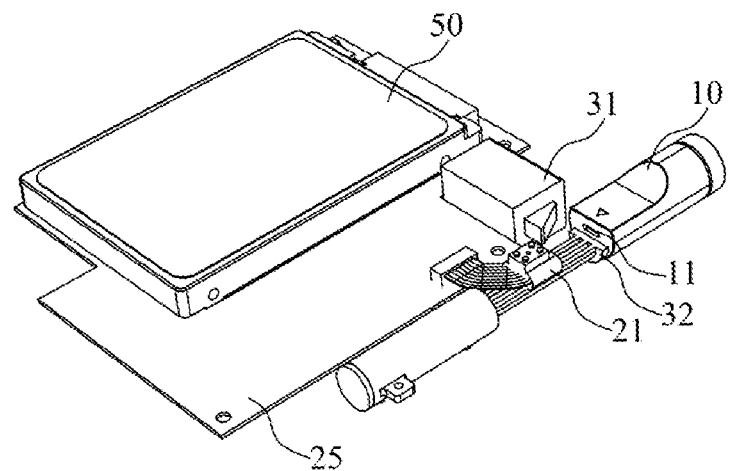
FIG. 6d is the third schematic view of using a dedicated storage module in a data retention method in a preferred embodiment.
Figure 6E:
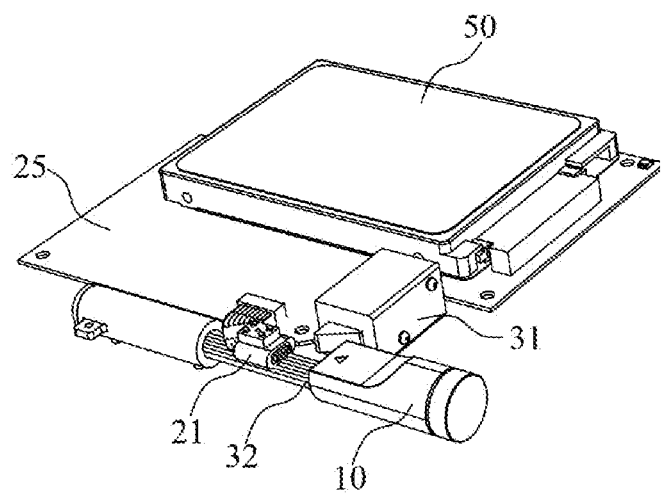
FIG. 6e is the fourth schematic view of using a dedicated storage module in a data retention method in a preferred embodiment.

Referring to FIGS. 6b and 6c, which illustrate a user triggers the locking element (31) to be released from the locking hole (12), detaching the dedicated storage module (10) by the power element (32) for separation between the data plug (11) and data socket (21) and removal of the dedicated storage module (10), as shown in FIGS. 6c and 6d.

To decrypt and access classified information (41) encrypted and saved in the storage element (14), a user should repeat steps to activate the dedicated storage module (10) and use an encrypted key which has been redefined by the fingerprint switch (33).

Accordingly, a data detention method which is different from an ordinary data storage method and referred to as creative work in applications of private cloud meets patentability and is applied for the patent.

It should be reiterated that the above descriptions present the preferred embodiment, and any equivalent change in specifications, claims or drawings still belongs to the technical field within the present disclosure with reference to claims hereinafter.

What is claimed is:

1. A data retention method, comprising steps as follows:
   step 1: a data plug of a dedicated storage module is inserted into a data socket of an encryption module and a locking element of a lock fastener module is fixed at a locking hole on the dedicated storage module;
   step 2: the encryption module and the dedicated storage module are electrically connected to each other through the data socket;
   step 3: an external component of the encryption module is electrically connected to an external device such that classified information is encrypted or decrypted between the external device and a storage element of the dedicated storage module by an encryption component of the encryption module during data exchanges.

2. The data retention method as claimed in claim 1 wherein a power source component is activated by a fingerprint switch before step 1.

3. The data retention method as claimed in claim 2 wherein classified information is encrypted or decrypted in the external device once by the encryption component of the encryption module during data exchanges and saved in an ordinary storage device after the external component of the encryption module is electrically connected to the external device.

4. The data retention method as claimed in claim 1 wherein a power receiving port in the locking hole and a power supply pot in the locking element are electrically connected to each other after step 1.

5. The data retention method as claimed in claim 1 wherein an indicator for the encryption module can display corresponding operation status.

6. The data retention method as claimed in claim 1 wherein a key which has been encrypted by the encryption component can be redefined through the fingerprint switch in step 3.

7. The data retention method as claimed in claim 1 wherein the locking element of the lock fastener module is released from the locking hole of the dedicated storage module and the data plug of the dedicated storage module is separated from the data socket of the encryption module after step 3.

8. The data retention method as claimed in claim 7 wherein a key which has been redefined by the fingerprint switch is available in step 3 when the classified information is accessed after step 1 again.

* * * * *